Jan. 4, 1938.     G. R. GREENSLADE     2,104,646
MEANS FOR TESTING
Original Filed June 20, 1935
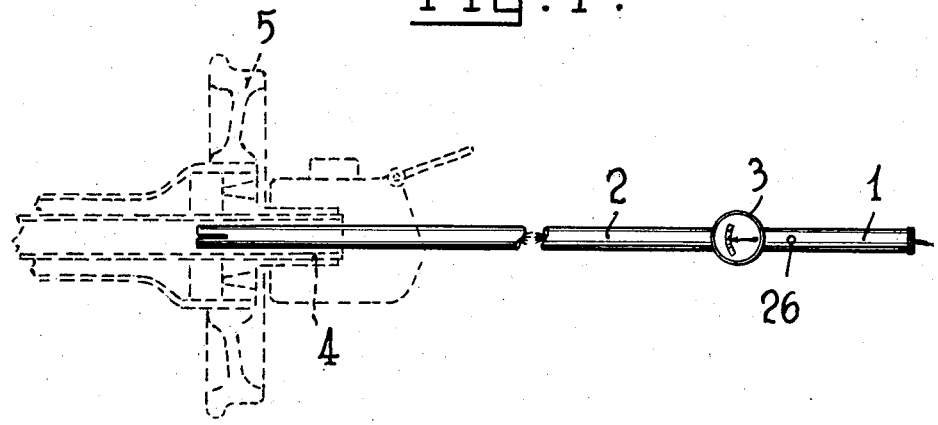
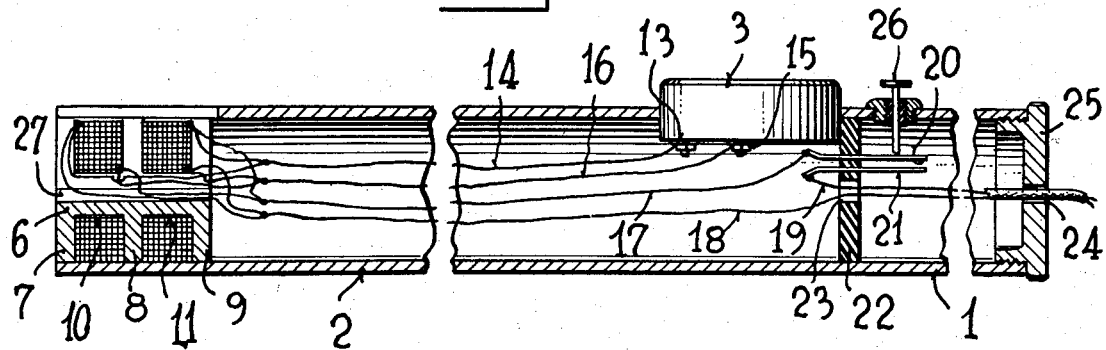
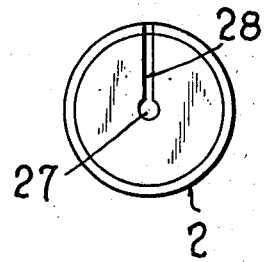
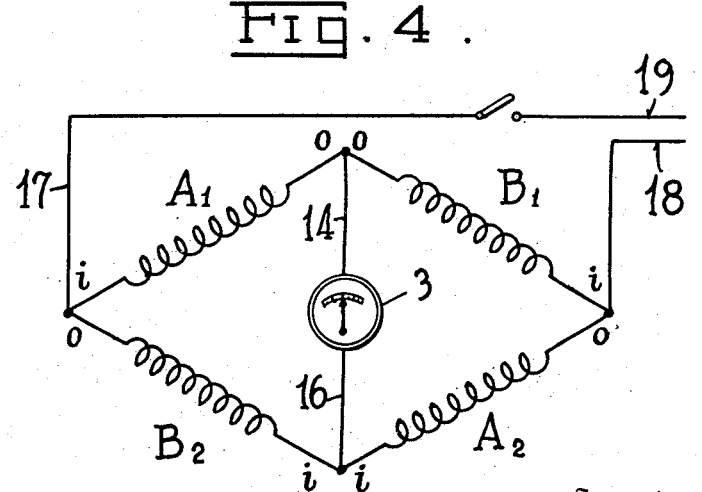
Inventor:
Grover R. Greenslade.
By Frank H. Wisch.
Attorney Patented Jan. 4, 1938

2,104,646

UNITED STATES PATENT OFFICE 2,104,646

MEANS FOR TESTING

Grover R. Greenslade, Scott Township, Allegheny County, Pa., assignor to Pittsburgh Dry Stencil Company, a corporation of Pennsylvania Application June 20, 1935, Serial No. 27,588
Renewed October 20, 1937

3 Claims. (Cl. 175—183)

This invention relates to apparatus for testing metal objects and more particularly to means for insertion in passageways in said objects to determine the presence or absence of fractures therein.

The device of the present invention comprises means provided with inductive windings which may be readily inserted into passageways usually included in the assembly and manufacture of certain metal structures. The interior portions of such structures are generally inaccessible except through such passageways, or unless the said structures are dismantled which involves a great deal of time and labor at considerable expense. It has long been considered highly desirable to provide some means by which a simple and effective test may be made to determine with accuracy the presence or absence of fractures in the above-mentioned structures and which means can be easily inserted into and moved along the length of the passageway, thereupon giving immediate indication of the condition of the said structures.

By way of illustrating the present invention, reference is made to the accompanying drawing in which—

Fig. 1 is a view showing one form of my device in position for testing, by way of example, the axle of a car wheel;

Fig. 2 is a longitudinal sectional view of the device shown in Fig. 1;

Fig. 3 is an end view of the testing device; and

Fig. 4 illustrates diagrammatically, electrical equipment employed in the device.

Although the drawing illustrates the application of the invention to testing of hollow axles for wheels on railway vehicles, it is to be understood that the test may be made on other ferrous structures having passageways therein of any cross sectional shape and size. The cross sectional shape of the testing means may be made to conform with that of the passageway. The cross sectional dimensions of the testing means should preferably be only a little smaller than the cross sectional dimensions of the passageway.

Referring to Fig. 1, the testing instrument comprising a handle portion 1, a testing rod portion 2 and an indicator 3, is shown in position for testing a hollow axle 4 for a car wheel 5.

As shown in Fig. 2, a core member 6 having flanges 7, 8 and 9 extending laterally from said core, forming grooves 10, and 11, is positioned in the outer or free end of the testing rod 2. The core member 6 is made of any magnetic metal such as iron, and the rod 2 is preferably made of brass or other suitable nonmagnetic metal.

Two strands of insulated wire are wound in one of the grooves 10 and two strands are wound in the other groove 11.

For a clear understanding of the winding and electrical connections in the instrument, reference is made to the diagram in Fig. 4 in conjunction with Fig. 2. Four inductive windings $A_1$, $A_2$, $B_1$ and $B_2$ are provided, each with the same number of turns about the core 6. The wires wound in groove 10 may be represented by $A_1$ and $A_2$, and the wires wound in groove 11 may be represented by $B_1$ and $B_2$. The outer ends of each of the windings are designated by the letter $o$ and the inner ends of each of the windings are designated by the letter $i$.

The outer ends of windings $A_1$ and $B_1$ are jointly connected to one of the terminals 13 of the meter 3 by means of a wire 14. The inner ends of windings $A_2$ and $B_2$ are jointly connected to the other terminal 15 of the meter 3 by means of a wire 16. The inner and outer ends respectively of windings $A_1$ and $B_2$ are jointly connected to one terminal of a switch in the handle 1 of the instrument by means of a wire 17. The inner and outer ends respectively of windings $B_1$ and $A_2$ are jointly connected to a wire 18 which with a wire 19 connected to the other terminal of the switch, passes to a source of alternating current. It is seen from the above that the current at any given instant will be in a reverse direction in the windings in one of the grooves, from that in the windings in the other groove on the core 6.

The switch in the handle 1 may be any type of switch. The type shown in Fig. 2 comprises two strips of metal 20 and 21 supported in spaced relation by a partition 22 and parallel to the sides of the handle 1. The partition 22 is made of insulating material. One end of each of the strips 20 and 21 is connected to wires 17 and 19 respectively. The lead wires 18 and 19 pass through an opening 23 in the partition and through an opening 24 in a screw cap 25 on the end of the handle 1. A button 26 on the handle 1 is pressed to bring the free ends of the strips 20 and 21 together to complete the circuit.

The wiring in the instrument is insulated throughout and may be of any suitable gauge.

The core 6 is preferably provided with a passageway 27 extending axially therethrough, and is also provided with a slot 28 extending radially from the passageway 27 as shown in Fig. 3. The slot 28 may extend through the rod 2. The slot 28 decreases eddy currents and forms a convenient passageway for the wiring.

The lead wires 18 and 19 may be connected to the secondary winding of a transformer (not shown) which may, if desired, lodge within the handle 1. The testing instrument may be made complete in itself without any connections to an outside current source. If desired, an interrupter and a battery may be provided in the handle 1, the lead wires 18 and 19 being connected to the secondary of the interrupter.

The four windings $A_1$, $A_2$, $B_1$ and $B_2$ on the core 6 form a balanced inductive winding of an inductive Wheatstone bridge. Since the wires are of equal length and size, the Wheatstone bridge is also balanced from the standpoint of resistance. Furthermore, since the inductive windings $A_1$ and $A_2$ are wound side by side in one of the grooves 10 on the core 6, and since $B_1$ and $B_2$ are wound side by side in the other groove 11 on the core 6, this balanced condition of the bridge exists only when nothing happens to disturb the magnetic fields about the two grooves with reference to each other. When the testing instrument is remote from any magnetic material, the bridge is balanced and no current is indicated in the A. C. meter when the circuit is closed. Also, when the tester is inserted in a uniform bore in a uniform structural element of magnetic material homogeneous throughout, the balanced condition exists.

When exploring a bore within a ferrous metal structural member with the implement described, the rod 2 is moved along the said bore while the button 26 is kept pressed down, and the operator watches the meter 3 for any abnormal variation in the reading. If a fracture exists in the member being tested and the fracture is opposite one or the other of the grooves, 10 or 11, the magnetic circuit of that particular groove is weakened as compared with the magnetic circuit of the other groove due to the proximity of the fracture. If the magnetic flux in the field about groove 10 (for instance) and linking around through the flanges 7 and 8 is weakened due to the presence of a fracture or other imperfection, the current through the wires $A_1$ and $A_2$ is increased. Stating this differently, under the conditions mentioned, the self inductance of $A_1$, the self inductance of $A_2$, and the mutual inductance of $A_1$ $A_2$ are all decreased so that, as stated above, more current will flow through $A_1$ and $A_2$ and this excess current will necessarily have to pass through the meter 3. The reverse would take place in $A_1$ and $A_2$ if the magnetic field of the core containing $B_1$ and $B_2$ were affected by the disturbance of the magnetic circuit opposite the groove 11 as by the presence of a fracture in the member tested.

The windings employed in the instrument provide means of obtaining great sensitivity. Somewhat heavy wire can be employed and a relatively large current can be used. When the balance is upset a proportionately large current passes through the meter.

I claim:

1. Apparatus for testing magnetizable metal objects comprising a core member of magnetic metal mounted on the end of a rod member provided with a handle, an alternating current meter mounted on the said handle, grooves provided in the said core member, a pair of inductive windings in each groove each pair being oppositely wound and the windings in each pair being connected in opposite sides of a Wheatstone bridge circuit.

2. In apparatus for testing magnetizable metal objects having passageways therein, to determine the presence or absence of defects therein, a core member of magnetic metal mounted adjacent the end of a supporting probe member and adapted for insertion and movement in a passageway in a magnetizable metal object to be tested, grooves provided in the said core member, a pair of inductive windings in each groove, each pair being oppositely wound and the windings in each pair being connected in opposite sides of a Wheatstone bridge circuit.

3. In apparatus for testing magnetizable metal objects having passageways therein, to determine the presence or absence of defects therein, a core member of magnetic metal adapted for insertion and movement in a passageway in a magnetizable metal object to be tested, two pairs of wound conductors spaced apart on the said core member and adapted to be connected to a source of alternating current, one pair of conductors being wound in a direction opposite to that of the windings in the other pair, and the conductors being connected in a Wheatstone bridge circuit in which a conductor in either pair is positioned on a side of the bridge circuit opposite that in which the other conductor in the same pair is positioned.

GROVER R. GREENSLADE.